United States Patent

[11] 3,581,557

| [72] | Inventors | Joe Drees<br>Saratoga;<br>Suvrat Kirtikar, Stanford, both of, Calif. |
|---|---|---|
| [21] | Appl. No. | 850,760 |
| [22] | Filed | Aug. 18, 1969 |
| [45] | Patented | June 1, 1971 |
| [73] | Assignee | Fairchild Camera and Instrument Corporation<br>Mt. View, Calif. |

[54] PNEUMATIC LEADWIRE BOND TESTER
14 Claims, 3 Drawing Figs.

| [52] | U.S. Cl. | 73/37 |
|---|---|---|
| [51] | Int. Cl. | G01m 3/02 |
| [50] | Field of Search | 73/37, 37.5;<br>222/3; 228/1; |

[56] References Cited
UNITED STATES PATENTS

| 3,072,289 | 1/1963 | Stopp | 222/3 |
|---|---|---|---|
| 3,364,728 | 1/1968 | Albertson et al. | 73/37.5 |
| 3,395,845 | 8/1968 | Best et al. | 228/1 |
| 3,413,839 | 12/1968 | Clark et al. | 73/37 |

Primary Examiner—Louis R. Prince
Assistant Examiner—William A. Henry II
Attorneys—Roger S. Borovoy and Alan H. MacPherson ABSTRACT: The strength of the two bonds between a leadwire, a semiconductor die and a corresponding semiconductor package lead is tested by passing a selected duration pulse of a gas past the leadwire so as to create drag forces on the leadwire. If either bond is defective, the drag forces on the leadwire are sufficient to destroy that bond.

INVENTORS
SUVRAT KIRTIKAR
JOE DREES

BY Alan H. Marks
ATTORNEY

PNEUMATIC LEADWIRE BOND TESTER

FIELD OF THE INVENTION

This invention relates to testing the strength of the bonds between semiconductor leadwires and contact pads on semiconductor dies or lead frames, or both. In particular, this invention relates to testing the strength of these bonds by subjecting the leadwires to limited duration pulses of gas.

PRIOR ART

One major problem in producing semiconductor devices is to ensure that the bonds between the contact pads on semiconductor dies and the leadwires connecting these dies to the semiconductor package leads and also between these leadwires and the semiconductor package leads are of good quality. Various tests have been proposed and used to test the strength of these bonds.

One test involves selecting a certain percentage of the semiconductor dies after leads have been bonded to the contact pads on the dies, and then pulling the leadwires until the bonds between the leadwires and the contact pads break. The pull force necessary to break the bond is recorded. If this force is above a minimum threshold force on a given percentage of the dies tested, the bonds are considered to be satisfactory. A similar destructive pull test can be used to test the strength of the bonds between the leadwire and the semiconductor package leads.

A second test blows a continuous stream of air past a leadwire at a velocity sufficient to pull the wire from the die contact pad or from the package leads if the strength of either bond is beneath a selected value.

These two tests have certain disadvantages. The measurement of the force necessary to destroy a bond is a destructive test which often renders the tested device useless. On the other hand, continuous air testing induces vibrations in the leadwire, fatiguing either the heel of bond (i.e., the place where the leadwire joins the bond) or the wire itself.

SUMMARY OF THE INVENTION

This invention overcomes the problems of prior-art testing by providing a testing process which does not destroy the device being tested and which does not induce undesired vibrations in the leadwire. Furthermore, the test of this invention can be conducted in sequence with the bonding operation itself and thus does not introduce significant additional complexity into the production process.

According to this invention, the bonds between a leadwire and a contact pad on a semiconductor die and between the leadwire and the semiconductor package leads, are tested by directing a pulse of gas across, and at a selected angle to, the leadwire. The pulse duration is selected to minimize the duration of any vibrations produced in the wire, while the velocity of the gas is selected to produce a sufficient force on the wire to destroy any weak bonds, but to leave undamaged bonds which have a strength above a minimum threshold strength. The pulse test of this invention can be carried out immediately after the leadwire has been bonded to the die and/or the package leads by structure mounted directly on the bonder.

DETAILED DESCRIPTION

The operation of the bond tester of this invention will be described in conjunction with a semiconductor die attached to the ceramic bottom of the well-known dual inline package. The tester is mounted for the purposes of this description on an ultrasonic bonding device. It should be understood, however, that this invention can be used to test the strength of the bonds attaching leads both to semiconductor dies and to package leads in a wide variety of packages. Furthermore, this invention can be used to test the strength not only of ultrasonic bonds, but also of ball and stitch bonds or of other types of bonds.

Figure 1:
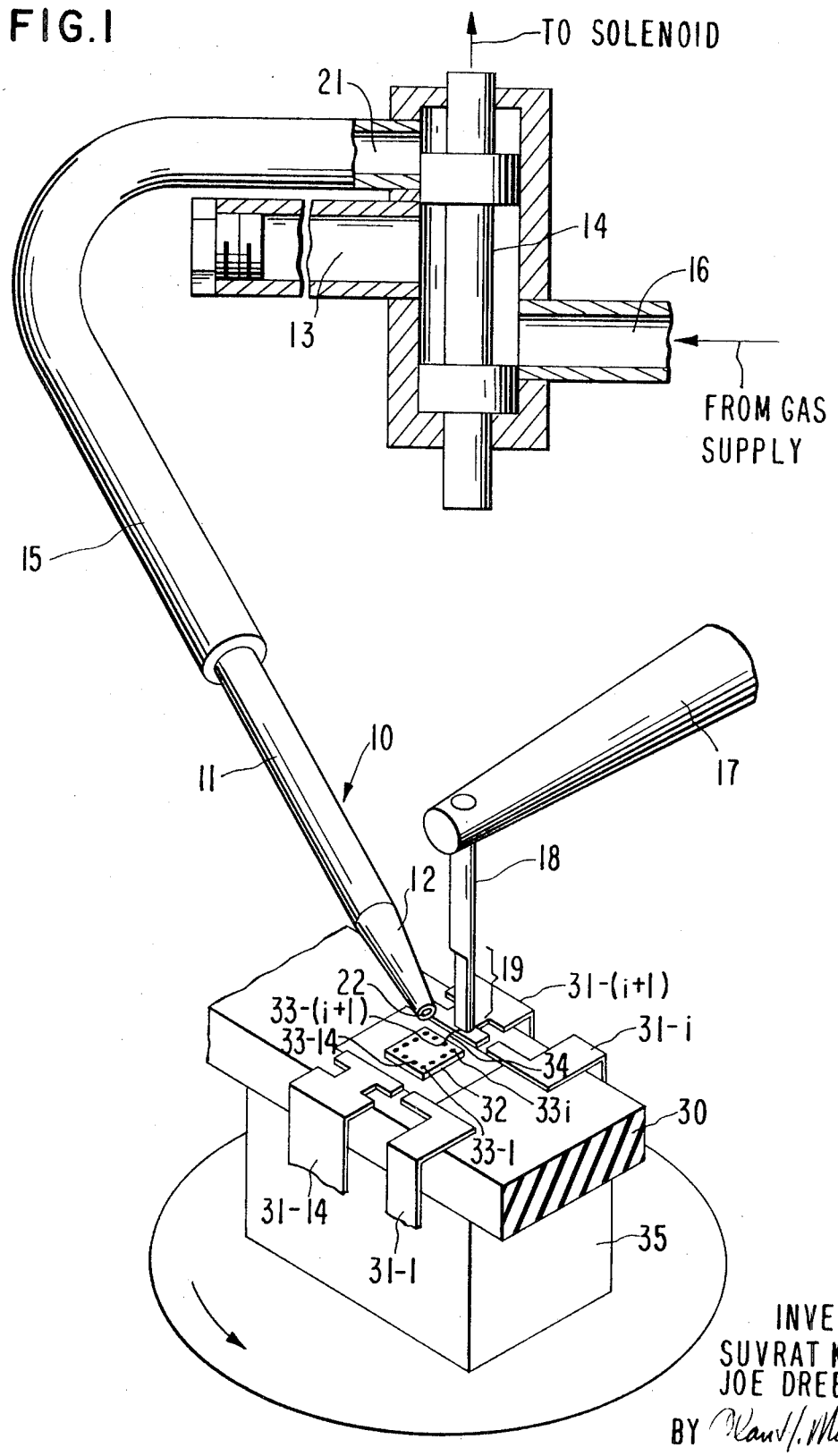
FIG. 1 shows the nondestructive pulsed gas leadwire tester of this invention.

In FIG. 1, a semiconductor die 32 bonded to a ceramic bottom 30 of a 14 lead dual inline package is placed on a rotatable chuck 35 beneath the bonding tool 17 of an ultrasonic bonder. Chuck 35 can be made to rotate either clockwise or counterclockwise on command. Bonding tool 17 will, on command, bond a wire, such as leadwire 34, to a contact pad on semiconductor die 32. Tool 17 also will bond the other end of leadwire 34 to a corresponding one of package leads 31-1 through 31-14.

Figure 2:
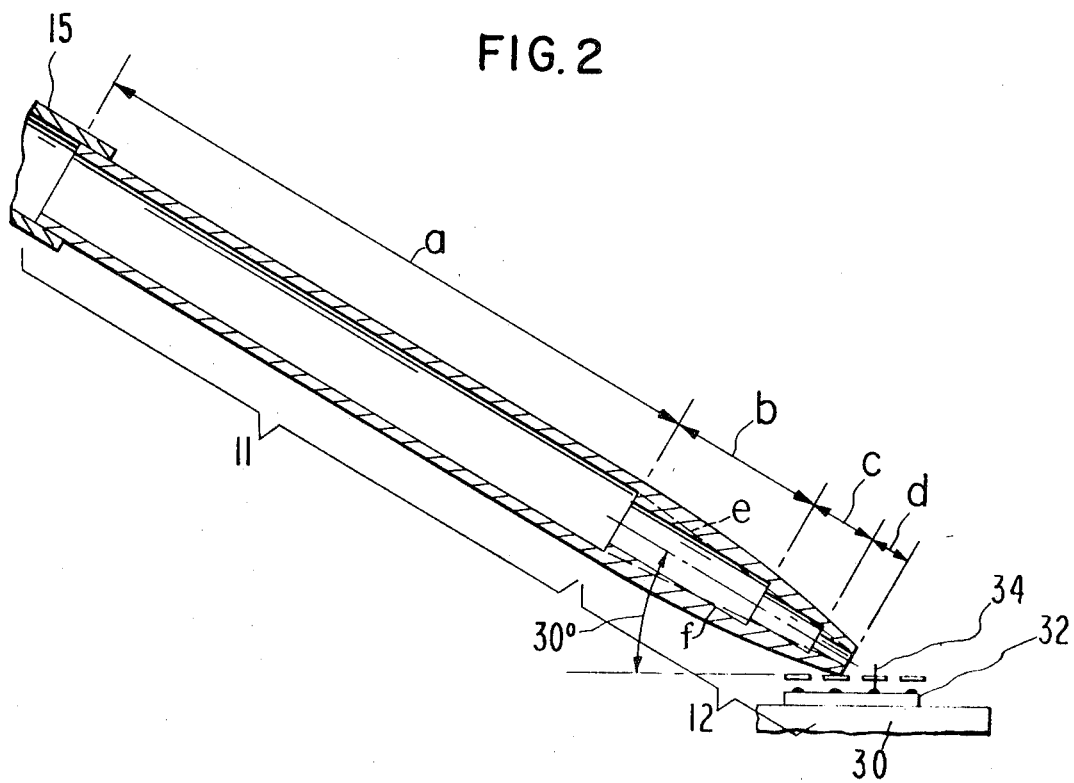
FIG. 2 shows a cross section of one nozzle appropriate for use with this invention, and the relationship of this nozzle to the leadwire whose bond to a contact pad and/or package lead is being tested.

Shown together with bonding tool 17 is nozzle 10. Nozzle 10 contains a constant area portion 11 and a converging portion 12. For a sufficiently large supply pressure, the gas leaving exit area 22 of nozzle 10 is at sonic velocity. The gas flow from the nozzle however is still laminar as the flow Reynold's number is beneath the critical Reynold's number demarking the laminar flow region from the turbulent flow region. As shown in FIG. 2, portion 12 of nozzle 10 converges in steps from a relatively large interior diameter, typically 90 mils, to a smaller exit area diameter of typically 20 mils. Nozzle 10 can, if desired, also contain a diverging portion to additionally accelerate the gas passing through the nozzle to a substantial supersonic velocity downstream from the nozzle throat. Also, if desired, portion 12 of nozzle 10 can converge smoothly as shown in FIG. 2 by dashed lines labeled $e$ and $f$, rather than in steps. A typical nozzle has a diameter of 90 mils in region $a$, a diameter of 50 mils in region $b$, a diameter of 30 mils in region $c$ and a diameter of 20 mils in region $d$. The lengths of regions $a$, $b$, $c$ and $d$ in one nozzle were 124 mils, 35 mils, 13 mils and 8 mils respectively. Constant area portion 11 of the nozzle is attached both to converging portion 12 and to supply tube 15. Tube 15 can be either elastic or rigid and might be either copper tubing or a flexible plastic tube.

A gas reservoir 13 contains a supply of gas, typically dry nitrogen. Valve 14, actuated by a solenoid (not shown) with a response time of about one (1) millisecond, releases the gas from reservoir 13 through port 21 into tube 15. The gas from reservoir 13 rushes through port 21, tube 15, straight portion 11 of nozzle 10, to exit area 22 of converging portion 12 of nozzle 10. When the ratio of gas pressure at the nozzle exit area 22 to the gas pressure in straight portion 11 of nozzle 10 is less than a critical value 0.528 for gases with a ratio of specific heats of 1.4, the gas flow from exit area 22 is a maximum for a given supply pressure, and the gas velocity at exit area 22 is sonic. The gas leaving exit area 22 passes wire 34. The aerodynamic drag on wire 34 induced by the gas flowing past wire 34 pulls the wire. If the drag force is beneath the breaking force of the bonds between wire 34, contact pad 33–($i+a01$) on die 32 and corresponding lead frame 31–($i+1$) 1) (as shown in FIG. 1) the bonds are good. The rotatable chuck 35 is then rotated (counterclockwise in FIG. 1) to place the previously bonded leadwire behind the exit area 22 of nozzle 10 in preparation for bonding a leadwire between contact pad 33–$i$ on die 32 and lead 31–$i$ from the semiconductor package.

If a bond is defective, the drag force exerted by the gas on the wire exceeds the breaking force of the bond. The bond then can often be reformed or the device discarded.

The pulse of gas from reservoir 13 lasts a selected duration, somewhere between 1 millisecond and 1 second. The duration is controlled by, for example, an electronic switch and delay circuit. At the end of the desired time, valve 14 is closed by the solenoid and new gas from port 16 enters reservoir 13.

The typical wire used to ultrasonically bond a semiconductor device to external circuitry is a 1 mil diameter aluminum wire containing at most 1.0 percent silicon impurities. This wire has a 14.5 gram tensile strength measured when elongation of 0.5 percent has occurred. The bond between such a wire and a silicon semiconductor die is good if the bond does not break until at least 3 grams pull is applied to the wire. Thus, in one embodiment of this invention, the gas pulse is designed to exert more than 1.5 grams pull on the leadwire for a duration of 50 milliseconds with a peak force of about 3 grams. The gas pulse duration is defined as the length of time of the air flow sufficient to cause detectable vibration in the wire. The capacity of reservoir 13 is 0.33 in$^3$ and nitrogen is stored in this reservoir at a pressure of 65 p.s.i.g. This gas from nozzle 10 is aimed at the center section of the leadwire. For example, a typical leadwire is 70 mils long from contact pad 33 to lead frame 31. Nozzle 10, and particularly exit area 22, is then aimed at the middle 20 to 35 mils of the wire with an angle between the nozzle and a horizontal plane of 30°. The center axis of nozzle 10 is in a plane substantially perpendicular to the plane of leadwire 34. Exit area 22 is typically located about 25 mils from leadwire 34.

A significant advantage of the tester shown in FIG. 1 is that each wire bond can be tested as made. Because the rotatable chuck 35 on which ceramic bottom part 30 is mounted rotates so as to take the previously bonded wire behind the exit area of nozzle 22, when the next wire is bonded to a corresponding contact pad 33, the previously bonded wire will not be blown or vibrated by the gas pulse from nozzle 10.

Figure 3:
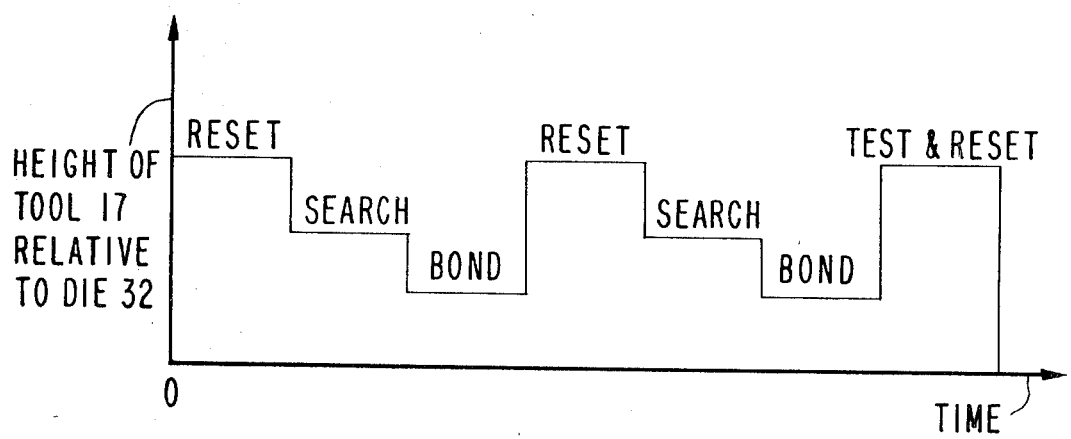
FIG. 3 shows one possible sequence of bonding and testing steps using the principles of this invention.

Nozzle 10 is mounted directly on the bonder. During the bonding operation the operator first resets the ultrasonic bonding tool 17 to a first height above chuck 35 (FIG. 3) and places the die 32 on chuck 35. Then the operator lowers tool 17 to a second height and searches to place the first contact pad 33 on die 32 beneath the tip 19 of ultrasonic bonding tool 17. When die 32 is properly located, the tool 17 with leadwire threadably attached, lowers to touch the appropriate contact pad 33 and ultrasonically bonds one end of wire 34 to the apprioriate contact pad (33-($i$+1) in FIG. 1). Tool 17 is now raised above the die. A pulse of air can now be directed from nozzle 10 past wire 34 to test this bond. Alternatively, with tip 19 of tool 17 located just above die 32 (FIG. 3) a second search is now made for the lead 31-($i$+1) to which the other end of wire 34 is to be attached. Upon properly locating this lead beneath tip 19 of tool 17, tip 19 lowers again to bond lead wire 34 to lead 31-($i$+1). While tool 17 is being raised in preparation for the counterclockwise rotation of die 32, a pulse of gas from nozzle 10 is directed at wire 34 to test the two bonds. If these bonds are destroyed (as evidenced by one or both ends of the wires coming loose) the die 32 is rotated into position for the next bond.

To prevent thermal shock to the semiconductor die 32 and wire 34 during testing, the gas stored in reservoir 13 can be preheated by a resistance coil, or any other appropriate heating structure, placed either in reservoir 13, tube 15 or nozzle 10.

Nozzle 10 is typically of stainless steel or copper. However, in general, the materials used for the air pulse tester shown in FIG. 1 are not crucial if the devices being bonded have been passivated.

What we claim:

1. A tester for testing the strength of bonds between leadwires, semiconductor dies and semiconductor package leads which comprises:
   a reservoir for storing a gas at high pressure;
   means for holding a substrate on which is mounted at least one leadwire whose bonds are to be tested;
   a nozzle held at a selected angle from the horizontal and at a selected distance from the leadwire whose bonds are to be tested;
   a conduit leading from said reservoir to said nozzle; and
   means for releasing, for a selected duration, a pulse of gas from said reservoir to flow through said conduit and said nozzle thereby to create force on said wire and thus to test the strength of said bonds, said means for holding being maintained stationary for said selected duration, thereby holding said leadwire a fixed distance from said nozzle for said duration, the duration of said pulse of gas being selected to minimize vibrations produced in said leadwire.

2. Structure as in claim 1 in which said nozzle is held at an angle of about 30° from the horizontal in a plane perpendicular to said leadwire, and at a distance of about 25 mils from said leadwire.

3. Structure as in claim 1 in which said means for releasing comprises;
   a solenoid actuated by switching means; and
   valve means connected to said solenoid, for opening and closing the exit port from said reservoir in response to a signal through said solenoid from said switching means.

4. Structure as in claim 1 in which said nozzle has a circular inside cross section and comprises both a straight portion containing a selected inside diameter and a converging portion, the inside diameter of which reduces from the inside diameter of said straight portion to a much smaller diameter at the exit area from said nozzle.

5. Structure as in claim 4 in which the inside diameter of said converging portion of said nozzle decreases in steps from the inside diameter of said straight portion to the inside diameter of said exit area.

6. Structure as in claim 4 in which the inside diameter of said nozzle decreases continuously from the inside diameter of said straight portion to the inside diameter of said exit area.

7. Structure as in claim 4 in which the inside diameter of said straight portion of said nozzle is approximately 90 mils and in which the inside diameter of said exit area of said converging portion of said nozzle is approximately 20 mils.

8. Structure as in claim 4 in which said reservoir has a capacity of about 0.33 cubic inches.

9. Structure as in claim 8 in which said gas is stored in said reservoir at a pressure of about 65 p.s.i.g.

10. Structure as in claim 9 in which said gas is released from said reservoir for a period such that the force on said wire is greater than about 1.5 grams for a duration of about 50 milliseconds.

11. Structure as in claim 1 in which said tester is mounted on a semiconductor wire bonding machine and said means for releasing is operated by the bonding machine's programming mechanism to release for said selected duration said pulse of gas from said reservoir upon completion of both bonds between said leadwire, said semiconductor die, and the corresponding semiconductor package lead thereby to test said bonds immediately after said bonds are made and before the next leadwire, if any, is bonded between said semiconductor die and the next corresponding semiconductor package lead.

12. The process of bonding a leadwire to a semiconductor die and to a corresponding semiconductor package lead which comprises:
   placing on a bonding machine a part of semiconductor package containing an exposed semiconductor die together with package leads to which contact pads on said die are to be connected by leadwires;
   placing the bonding tool in a dwell position while the first contact pad to which the leadwire is to be bonded is located beneath said tool;
   bonding the first end of said leadwire to said contact pad;
   moving said tool to a reset position while said semiconductor package part containing said semiconductor die is moved to a new position beneath said tool;
   moving said tool to a dwell position while said package lead to which the other end of said leadwire is to be bonded is located accurately beneath said tool;
   bonding the second end of said leadwire to said corresponding semiconductor package lead; and
   passing a pulse of air past said bonded leadwire to test the strength of said bonds between said leadwire, said contact pad on said semiconductor die, and said semiconductor package lead.

13. The process of claim 12 including after bonding the first end of said leadwire to said contact pad, the additional step of testing the strength of the resulting bond by passing a selected duration pulse of gas past said wire thereby to create pull forces on said wire and said bond.

14. In combination
means for bonding a leadwire to a semiconductor die and to a semiconductor package lead; and
means for selectively directing a gas pulse across said leadwire, thereby to create drag forces on said leadwire to test the strength of the bonds between said leadwire, said semiconductor die and said semiconductor package lead.